US007819035B2

(12) United States Patent
Draper et al.

(10) Patent No.: US 7,819,035 B2
(45) Date of Patent: Oct. 26, 2010

(54) DETACHABLE, QUICK DISCONNECT SYSTEM FOR NONDESTRUCTIVE TESTING COMPONENTS

(75) Inventors: Jeffrey Draper, McVeytown, PA (US); Matthew Wolf, Boalsburg, PA (US)

(73) Assignee: GE Inspection Technologies, LP, Lewistown, PA (US)

( * ) Notice: Subject to any disclaimer, the term of this patent is extended or adjusted under 35 U.S.C. 154(b) by 407 days.

(21) Appl. No.: 12/102,397

(22) Filed: Apr. 14, 2008

(65) Prior Publication Data

US 2009/0255352 A1 Oct. 15, 2009

(51) Int. Cl.
*G01D 21/00* (2006.01)
*H01R 4/50* (2006.01)

(52) U.S. Cl. .................................... 73/866.5; 439/348

(58) Field of Classification Search ................ 73/866.5; 439/348
See application file for complete search history.

(56) References Cited

U.S. PATENT DOCUMENTS 4,249,799 A 2/1981 Iglesias
4,438,399 A 3/1984 Schnabl et al.
4,846,714 A 7/1989 Welsby et al.
6,220,891 B1 4/2001 Hils
6,386,789 B1 5/2002 Chausse et al.
6,805,572 B1 * 10/2004 Lai ............................ 439/348
7,001,199 B1 2/2006 Badalpour
2004/0126182 A1 * 7/2004 Lin ......................... 403/322.2

OTHER PUBLICATIONS

PCT Search Report issued in connection with corresponding WO Patent Application No. US09/37546 filed on Mar. 3, 2009.

* cited by examiner

*Primary Examiner*—Hezron Williams
*Assistant Examiner*—Nathaniel Kolb
(74) *Attorney, Agent, or Firm*—Global Patent Operation; Mark A. Conklin

(57) ABSTRACT

A connector system for attaching a probe to a probe shaft mating assembly comprising: a probe shaft mating assembly comprising a connector body, a plunger chamber located within the connector body, a spring located within the plunger chamber, a locking ball channel extending through the connector body from the plunger chamber to the outer surface of the connector body, a locking ball located within the locking ball channel, and a plunger located within the plunger chamber adjacent to the spring, wherein the locking ball is in contact with the outer surface of the plunger; a probe comprising a probe body, a probe shaft chamber located within the probe shaft facing end of the probe body, and a locking ball receiver located in the probe body adjacent to the probe shaft chamber; wherein the diameter of the probe shaft chamber is larger than that of the probe shaft mating assembly such that when the plunger and the spring are moved from a first position to a second position, the locking ball moves inwardly towards the plunger chamber and below the outer surface of the connector body allowing the probe facing end of the probe shaft mating assembly to enter the probe shaft chamber, and when the plunger and spring are moved from the second position to the first position, the locking ball moves towards the surface of the connector body, extending beyond the outer surface of the connector body such that the locking ball engages the locking ball receiver and fixes the probe to the probe shaft mating assembly.

12 Claims, 9 Drawing Sheets

DETACHABLE, QUICK DISCONNECT SYSTEM FOR NONDESTRUCTIVE TESTING COMPONENTS

BACKGROUND OF THE INVENTION

This invention relates generally to nondestructive testing, and more particularly to a detachable, quick disconnect system for nondestructive testing components.

Nondestructive testing devices can be used to inspect test objects to identify and analyze flaws and defects in the objects both during and after an inspection. Nondestructive testing allows an operator to maneuver a probe at or near the surface of the test object in order to perform testing of both the object surface and underlying structure. Nondestructive testing is particularly useful in some industries, e.g., aerospace and nuclear power generation, where component testing can take place without removal of the component from surrounding structures, and where hidden defects can be located that would otherwise not be identifiable through visual inspection.

One example of nondestructive testing is eddy current testing. In nondestructive eddy current testing, an oscillator or other signal generator produces an alternating current (AC) drive signal (e.g., a sine wave) that drives a coil of an eddy current probe placed in close proximity to an electrically conductive test object. The drive signal in the probe coil produces an electromagnetic field which penetrates into the electrically conductive test object and induces eddy currents in the test object, which, in turn, generate their own electromagnetic field. The frequency of the drive signal as well as material properties of the test object (e.g., electrical conductivity, magnetic permeability, etc.) determine the depth that a particular electromagnetic field penetrates the test object, with lower frequency signals penetrating deeper than higher frequency signals. For most inspection applications, eddy current probe frequencies in the range of 1 kHz to 3 MHz are used.

The electromagnetic field generated by the eddy currents generates a return signal in the eddy current probe. Comparison of the drive signal to the return signal can provide information regarding the material characteristics of the test object, including the existence of flaws or other defects at a particular depth. Placing the eddy current probe over a section of the test object that is known to have no flaws or defects results in the creation of a return signal that can be used to establish a reference or null signal. Determining the differences (e.g., phase shift) between the drive signal and this reference or null signal establishes reference data against which subsequent measurements of unknown sections of the test object may be made.

These subsequent measurements of unknown sections of the test object can be made by sliding the eddy current probe along the surface of the test object and continually monitoring the differences between the drive signal and the return signal generated by the eddy current electromagnetic field. To the extent that the differences between the drive signal and the return signal are not consistent with the differences between the drive signal and the reference or null signal, that may indicate the presence of a flaw or other defect (or other change in material characteristics) at that location in the test object.

Eddy current testing has a very broad range of applications, including surface and near surface flaw detection, inspection of multi-layer structures, metal and coating thickness measurement, metal sorting by grade, and hardness and electrical conductivity measurement. In addition, eddy current testing offers important advantages for the detection of flaws in metals including high sensitivity to microscopic flaws, high inspection speeds, ease of automation, ease of learning, quick use, no need for contact or coupling with the inspection test object, no consumption of materials, environmental friendliness and cost effectiveness.

Generally, an eddy current testing system can include a probe for sending and receiving signals to and from a test object, a semi-rigid probe shaft connecting the probe to an eddy current test unit, and a screen or monitor for viewing test results. The eddy current test unit can include power supply components, signal generation, amplification and processing electronics, and device controls used to operate the nondestructive testing device. Depending on the test object, test object material composition, and environment in which the testing is being performed, eddy current testing systems typically employ a variety of probes, including, for example, absolute probes, differential probes, reflection probes, unshielded probes, and shielded probes.

Absolute probes normally consist of a single coil (or winding) that can respond to all changes in an area being inspected. Absolute probes can be used to detect gradual changes (e.g., metallurgy variations, heat treatment and shape), as well as sudden changes (e.g., cracks). Differential probes normally involve two or more balanced coils that are generally positioned close together such that they only respond to sharp changes in the material such as cracks. Differential probes are insensitive to gradual changes such as metallurgy variations, geometry and slowly increasing cracks, and dramatically reduce lift-off signal. Reflection probes utilize a driver coil to induce eddy currents in an object being tested, and a separate sense coil or pick-up to detect eddy current field changes as the test object is scanned. Reflection probes can be differential or absolute, and provide a greater frequency range than that of commonly used bridge connected coil arrangements. Unshielded probes are lower in cost to produce and have a wider eddy current field than an equivalent shielded probe. The wider scan width results in fewer passes being required to scan a given area. Unshielded probes are more tolerant of lift-off and probe angle, but are affected by edges, fasteners and nearby discontinuities. Shielded probes can have a magnetic shield placed around it in order to narrowly focus the field at the sensor tip and restrict the spread of the field. Shielded probes can be sensitive to small cracks and are unaffected by edges, geometry changes and adjacent ferrous material.

Another example of nondestructive testing is ultrasonic testing. When conducting ultrasonic testing, an ultrasonic pulse is emitted from a probe and passed through a test object at the characteristic sound velocity of that particular material. The sound velocity of a given material is a physical constant that depends mainly on the modulus of elasticity and density of the material. Application of an ultrasonic pulse to a test object causes an interaction between the ultrasonic pulse and the test object structure, with sound waves being reflected back to the probe. The corresponding evaluation of the signals received by the probe, namely the amplitude and time of flight of those signals, allows conclusions to be drawn as to the internal quality of the test object without destroying it.

Generally, an ultrasonic testing system includes a probe for sending and receiving signals to and from a test object, a semi-rigid probe shaft connecting the probe to an ultrasonic test unit, and a screen or monitor for viewing test results. The ultrasonic test unit can include power supply components, signal generation, amplification and processing electronics, and device controls used to operate the nondestructive testing device. Electric pulses are generated by the transmitter and are fed to the probe where they are transformed into ultrasonic pulses by a piezoelectric element (e.g., crystal, ceramic or polymer). The amplitude, timing and transmit sequence of the electric pulses applied by the transmitter are determined by various control means incorporated into the ultrasonic test unit. The pulse is generally in the frequency range of about 0.5 MHz to about 25 MHz. The ultrasonic pulses are emitted from the probe and are passed through the test object. As the ultrasonic pulses pass through the object, various pulse reflections called echoes occur as the pulse interacts with internal structures within the test object and with the opposite side (backwall) of the test object. The echo signals are displayed on the screen with echo amplitudes appearing as vertical traces and time of flight or distance as horizontal traces. By tracking the time difference between the transmission of the electrical pulse and the receipt of the electrical signal and measuring the amplitude of the received wave, various characteristics of the material can be determined. Thus, for example, ultrasonic testing can be used to determine material thickness or the presence and size of imperfections within a given test object.

Ultrasonic testing systems typically employ a variety of probes depending on the test object, test object material composition, and environment in which the testing is being performed. For example, a straight-beam probe transmits and receives sound waves perpendicular to the surface of the object being tested. A straight-beam probe is particularly useful when testing sheet metals, forgings and castings. In another example, a TR probe containing two elements in which the transmitter and receiver functions are separated from one another electrically and acoustically can be utilized. A TR probe is particularly useful when testing thin test objects and taking wall thickness measurements. In yet another example, an angle-beam probe that transmits and receives sound waves at an angle to the material surface can be utilized. An angle-beam probe is particularly useful when testing welds, sheet metals, tubes and forgings.

The physical conditions of the typical nondestructive testing environment in which nondestructive testing devices operate require that the testing devices be versatile and rugged. The ability to operate a nondestructive testing device in environments up to 80 degrees Celsius, such as a hot engine or turbine, is sometimes necessary and cost effective, as opposed to first waiting for the engine or turbine to cool down before performing the inspection. In situations in which the nondestructive testing device is exposed to liquid environments, such as water, excellent sealing of the device to prevent the liquid from entering the probe is necessitated. Finally, because the typical nondestructive testing environment can be an industrial setting that subjects the probe to potential dropping or being struck by other objects, nondestructive testing devices should be mechanically strong enough to endure harsh environments and accidental mishandling.

Some nondestructive testing devices employ long (e.g., eighty foot) semi-rigid probe shafts with probes permanently attached to their distal ends. In the event the probe is damaged such that it is no longer usable, the entire probe shaft and probe assembly has to be replaced at significant cost. Similarly, if an operator wishes to change the type of probe head with which to conduct testing, the entire probe shaft and probe assembly must be switched. Storage and transport of multiple probe shaft and probe assemblies can be time consuming and costly.

In other nondestructive testing devices the probe has been made detachable from the probe shaft. In some embodiments, the ends of both the probe shaft and probe are threaded such that the probe contains a threaded collar at its proximal end that can be mated to a threaded receiver on the distal end of the probe shaft. Although this arrangement solves the problem of making the probe detachable, there are several limitations in its application. Through repeated probe shaft movements, such as those that typically occur during the testing process, the threaded assembly can loosen. A loose probe can result in inaccurate test results or, even worse, detachment and loss of the probe within the test environment. Equally detrimental, the threads located on both the probe and the probe shaft receiver are subject to thread galling, and may become dirty and eventually jam the thread mechanism, preventing the proper attachment or detachment of the probe from the distal end of the probe shaft.

In other embodiments, the proximal end of the probe is attached to the probe shaft using a threaded screw that extends through the distal face of the probe, through the probe itself, and into the distal end of the probe shaft where it is mated with a threaded receiver fixed to the distal end of the probe shaft. Although this arrangement solves the problem of making the probe detachable, it has several limitations. In particular, use of the screw requires that the probe be rigid and unbending, thereby limiting the use of the probe in some applications where a bendable probe is required. In addition, use of a screw does not eliminate the problems of thread galling, dirt accumulation and jamming. Furthermore, a specific tool is typically necessary to engage and disengage the screw from the probe shaft, requiring an operator to ensure that the specific tool is available during an inspection.

It would be advantageous to provide a detachable, quick disconnect system for nondestructive testing devices that allows a probe or other nondestructive testing component to be attached to the distal end of the probe shaft in a way that provides an effective, waterproof, electrical and mechanical connection between the probe and probe shaft suitable for use in industrial nondestructive testing applications, while eliminating the need for a threaded connection mechanism.

BRIEF DESCRIPTION OF THE INVENTION

A connector system for attaching a probe to a probe shaft mating assembly comprising: a probe shaft mating assembly comprising a connector body, a plunger chamber located within the connector body, a spring located within the plunger chamber, a locking ball channel extending through the connector body from the plunger chamber to the outer surface of the connector body, a locking ball located within the locking ball channel, and a plunger located within the plunger chamber adjacent to the spring, wherein the locking ball is in contact with the outer surface of the plunger; a probe comprising a probe body, a probe shaft chamber located within the probe shaft facing end of the probe body, and a locking ball receiver located in the probe body adjacent to the probe shaft chamber; wherein the diameter of the probe shaft chamber is larger than that of the probe shaft mating assembly such that when the plunger and the spring are moved from a first position to a second position, the locking ball moves inwardly towards the plunger chamber and below the outer surface of the connector body allowing the probe facing end of the probe shaft mating assembly to enter the probe shaft chamber, and when the plunger and spring are moved from the second position to the first position, the locking ball moves towards the surface of the connector body, extending beyond the outer surface of the connector body such that the locking ball engages the locking ball receiver and fixes the probe to the probe shaft mating assembly.

DETAILED DESCRIPTION OF THE INVENTION

Figure 1:
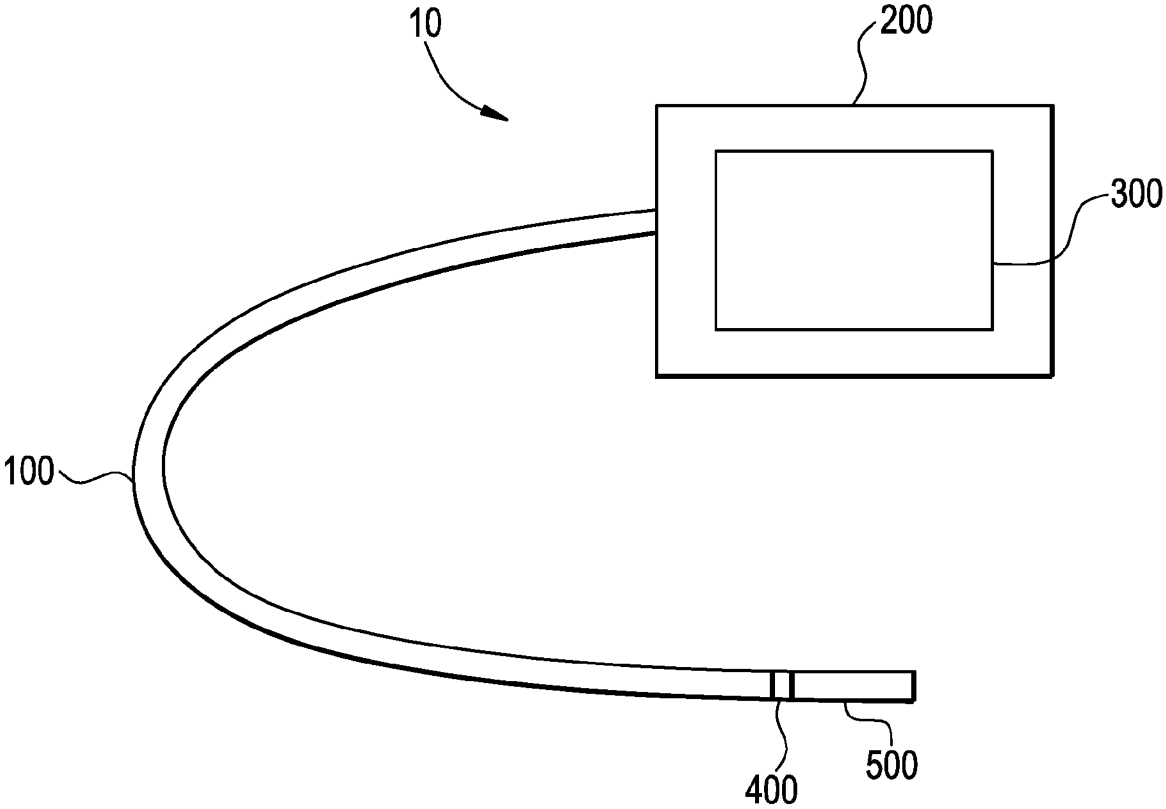
FIG. 1 is a block diagram of a nondestructive testing device.

FIG. 1 shows a block diagram of a nondestructive testing device 10. A probe 500 is attached to the distal end of probe shaft 100 by probe shaft mating assembly 400. Probe 500 can be any nondestructive testing probe or component, e.g., eddy current probe, ultrasonic probe, ultrasonic array, eddy current array. Probe shaft 100 can be an eight wire bundle surrounded by a semi-rigid nylon sheathing. The proximal end of probe shaft 100 is connected to nondestructive testing unit 200. Nondestructive testing unit 200 can include power supply components, signal generation, amplification and processing electronics, and device controls used to operate the nondestructive testing device 10. In addition, nondestructive testing unit 200 can include a screen 300 for viewing device operation and testing results.

Figure 2:
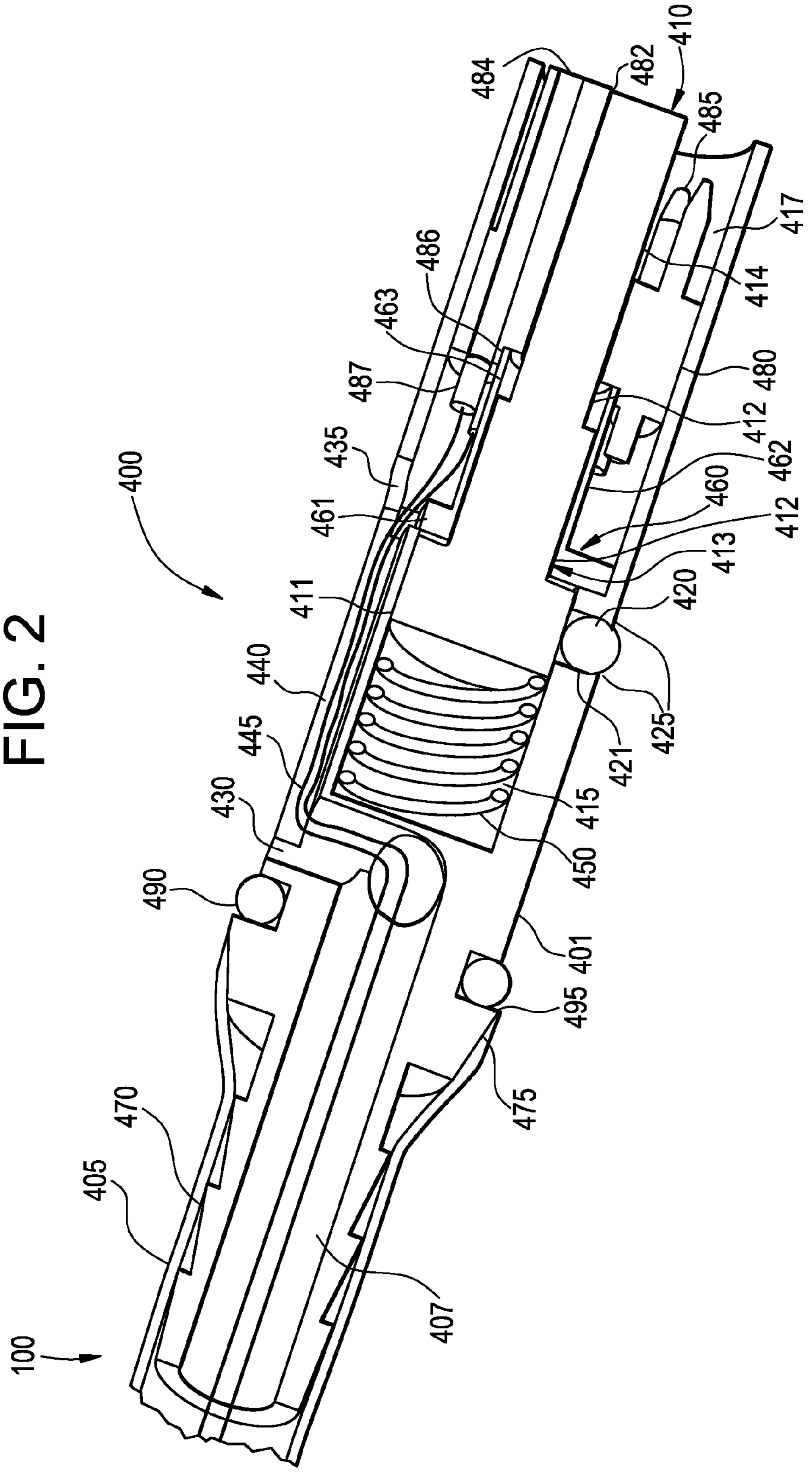
FIG. 2 is a sectional view of a probe shaft mating assembly.

With reference to FIG. 2, the distal end of probe shaft 100 can be attached to probe shaft mating assembly 400. The probe shaft mating assembly 400 can consist of a cylindrical hose barb 470 that can be integrally attached at its distal end to a cylindrical hose flange 475 that, in turn, can be integrally attached at its distal end to a cylindrical connector body 401. In one embodiment, hose barb 470, hose flange 475 and connector body 401 can be made of metal (e.g., stainless steel). Internal wires 445 can extend beyond the distal end of the probe shaft sheathing 405 of probe shaft 100. The hose barb 470 is positioned between the wires 445 of probe shaft 100 and the probe shaft sheathing 405 and epoxy is applied such that the epoxy and compressional force of the probe shaft sheathing 405 against the hose barb 470 fixes the probe shaft 100 to probe shaft mating assembly 400 and provides a waterproof seal. Wire chamber 497 can be a cylindrical hollow space that extends through the center of hose barb 470, hose flange 475, and into the proximal end of connector body 401. A plurality of proximal wire conduits 430 extend radially from the distal end of the wire chamber 497 outwardly to the cylindrical surface of the connector body 401. A plurality of central wire conduits 440 are recessed along the outer surface of connector body 401 and extend parallel to the outer surface of the connector body 401 towards the distal end of connector body 401. A plurality of distal wire conduits 435 can be located at the distal end of each central wire conduit 440, extending radially from the outer surface of connector body 401 inwardly to the proximal end of connector chamber 417. Connector chamber 417 is a cylindrical hollow cavity located at the distal end of connector body 401.

Figure 3:
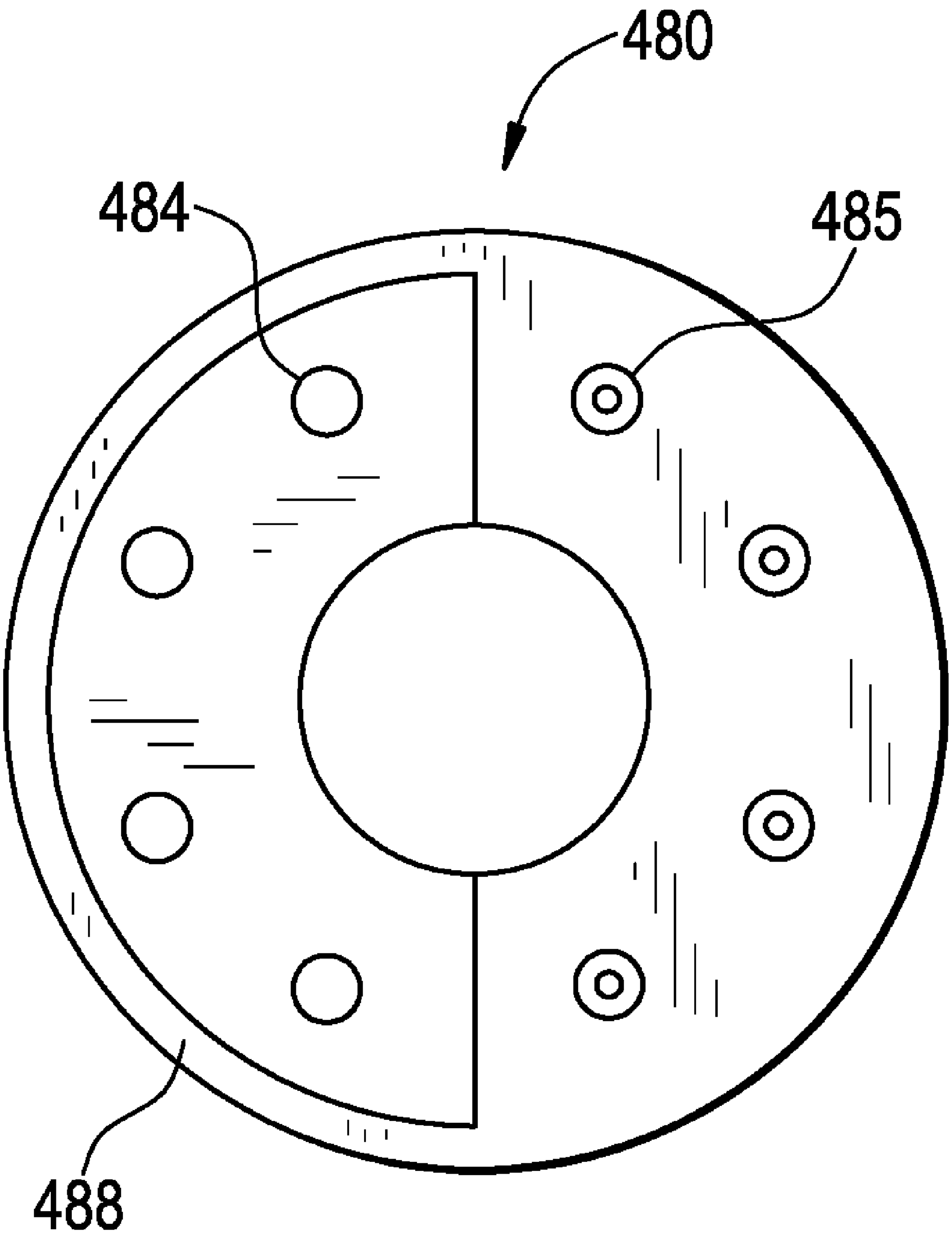
FIG. 3 is a perspective view of a probe shaft wire connector.

A cylindrical stepped plunger flange 460 can be positioned at the proximal end of connector chamber 417 and epoxied to the connector body 401 such that the plunger flange base 461 can be located adjacent to the proximal end of connector chamber 417 with the plunger flange base 461 fitting snugly within connector chamber 417. Plunger flange hub 462 can be integrally attached to the center of plunger flange base 461 and extend distally from the distal surface of plunger flange base 461, approximately parallel to the sides of connector chamber 417. Flange bore 463 can be a cylindrical gap that extends through the center of plunger flange 460. The diameter of plunger flange hub 462 can be less than that of the connector chamber 417, forming an open space between the outer surfaces of plunger flange hub 462 and the inner wall of connector chamber 417. Probe shaft wire connector 480 can be located at the distal end of plunger flange hub 462, seated snugly within and pinned and epoxied to the inner walls of connector chamber 417. In one embodiment, probe shaft wire connector 480 can be a cylindrical eight pin hermaphroditic Lemo connector consisting of 4 male connection pins and 4 female connection sockets located in a radial arrangement at its distal end. Each connection pin and socket can extend proximally through probe shaft wire connector 480, and can form a radial arrangement of connector contacts 487 on the proximal end of probe shaft wire connector 480. In other embodiments, probe shaft wire connector 480 can have fewer or additional connection points providing for fewer or greater than eight wire connections. Connectors suitable for use as probe shaft wire connector 480 are available from Lemo USA, Inc. of Rohnert Park, Calif. As shown in FIG. 3, the male connector pins 485 are grouped together in a radius on a first half of the distal surface of probe shaft wire connector 480, while the female connection sockets 484 are grouped together in a radius on a second half of the distal surface of probe shaft wire connector 480. The female connector sockets 484 can be embedded in a probe shaft connector ridge 488 that extends radially around half of the circumference of the distal surface of probe shaft wire connector 480. The distal end of probe shaft connector ridge 488 can extend to the distal end of connector body 401. Connector bore 482 is a cylindrical gap that extends through the center of probe shaft wire connector 480. Connector notch 486 can be a cylindrical cutout with a diameter less than that of the probe shaft wire connector 480, located at the proximal end of probe shaft wire connector 480 running parallel to the walls of connector chamber 417. The distal end of plunger flange hub 462 can be such that it fits snugly within connector notch 486 and positions probe shaft wire connector 480 at the proper distance from the proximal end of connector chamber 417.

Wires 445 can extend out of probe shaft 100, into the wire chamber 407, through one of the proximal wire conduits 430, distally along central wire conduit 440, through the corresponding distal wire conduit 435 located at the distal end of the central wire conduit 440, through the space within connector chamber 417 between the inner walls of connector chamber 417 and the plunger flange hub 462, and can be attached to one of the connector contacts 487 located on the proximal end of probe shaft wire connector 480, forming an electrical connection between the wires 445 and the probe shaft wire connector 480. Once the wires 445 have been routed through the probe shaft mating assembly 400 to the designated connector contacts 487, the wire conduits can be potted with an epoxy to seal the proximal wire conduit 430, central wire conduit 440 and distal wire conduit 435, providing a waterproof seal. Routing of the wires 445 in this fashion prevents interaction of the wires 445 with any of the moving mechanical components of the probe shaft mating assembly 400 or probe 500, thereby protection the wires 445 from undue physical stress.

Plunger chamber 415 can be located within connector body 401, distal to the proximal wire conduits 430, adjacent and proximal to the proximal end of plunger flange 460, and proximal to the connector chamber 417. Plunger chamber 415 can be a cylindrical hollow space of a diameter smaller than that of the connector chamber 417, extending distally within connector body 401 parallel to the outer surfaces of connector body 401. Plunger 410 can be located within connector body 401, extending distally from plunger chamber 415 to the distal end of connector body 401. In one embodiment, plunger 410 can be made of metal (e.g., stainless steel). Plunger head 411 is located at the proximal end of plunger 410 within plunger chamber 415. Spring 450 is located between the proximal surface of plunger head 411 and the proximal end of plunger chamber 415 such that the distal end of plunger head 411 is pushed to the distal end of plunger chamber 415 and against the proximal surface of plunger flange 460. Plunger rod 412 can be integrally attached to the distal end of plunger head 411 and can be a cylindrical, stepped, rigid rod. Plunger rod 412 can be comprised of a plunger rod proximal section 413 and a plunger rod distal section 414. The plunger rod proximal section 413 can be of a larger diameter than the plunger rod distal section 414, and can extend from the distal side of plunger head 411 through flange bore 463 such that the outer surface of plunger rod proximal section 413 fits snugly against the inner walls of flange bore 463. The plunger rod distal section 414 can be of a smaller diameter than the plunger rod proximal section 413, and can extend from the distal end of the plunger rod proximal section 413 distally through the flange bore 463 and through the connector bore 482. The distal end of plunger 410 can be located at the distal end of the connector body 401.

A plurality of ball channels 421 can be located near the distal end of plunger chamber 415 and can extend radially through connector body 401 to the outer surface of connector body 401. In one embodiment three ball channels 421 can be equally spaced around the circumference of the connector body 401. In other embodiments, fewer or additional ball channels 421 can be included. Locking ball 420 can be a round moveable ball within ball channel 421. In one embodiment, locking ball 420 can be comprised of metal (e.g., stainless steel). At the surface of the connector body 401, the diameter of the ball channels can be made narrower than the diameter of the locking ball 420, thereby forming a ridge 425 that prevents the locking ball 420 from extending through the outer surface of the connector body entirely. When spring 450 is in a relaxed position, plunger head 411 is forced distally towards the plunger flange 460 such that the plunger head 411 pushes the locking ball 420 towards the outer surface of connector body 401 and against ridge 425. When spring 450 is compressed towards the proximal end of the probe shaft mating assembly 400, the locking balls 420 are free to move back into the ball channels 421 and against the plunger rod proximal section 413, thereby retracting locking balls 420 from the surface of the connector body 401. Spring 450 is compressed by applying a proximally directed force on the distal end of plunger 410 at the distal end of probe shaft mating assembly 400.

Notch 495 is located at the proximal end of connector body 401 adjacent to the distal side of the hose flange 475. Notch 495 is of a diameter less than that of the rest of the connector body, and provides for the seating of O-ring 490. O-ring 490 is comprised of an elastomeric material and provides a waterproof seal when probe 500 is connected to probe shaft mating assembly 400.

Figure 4:
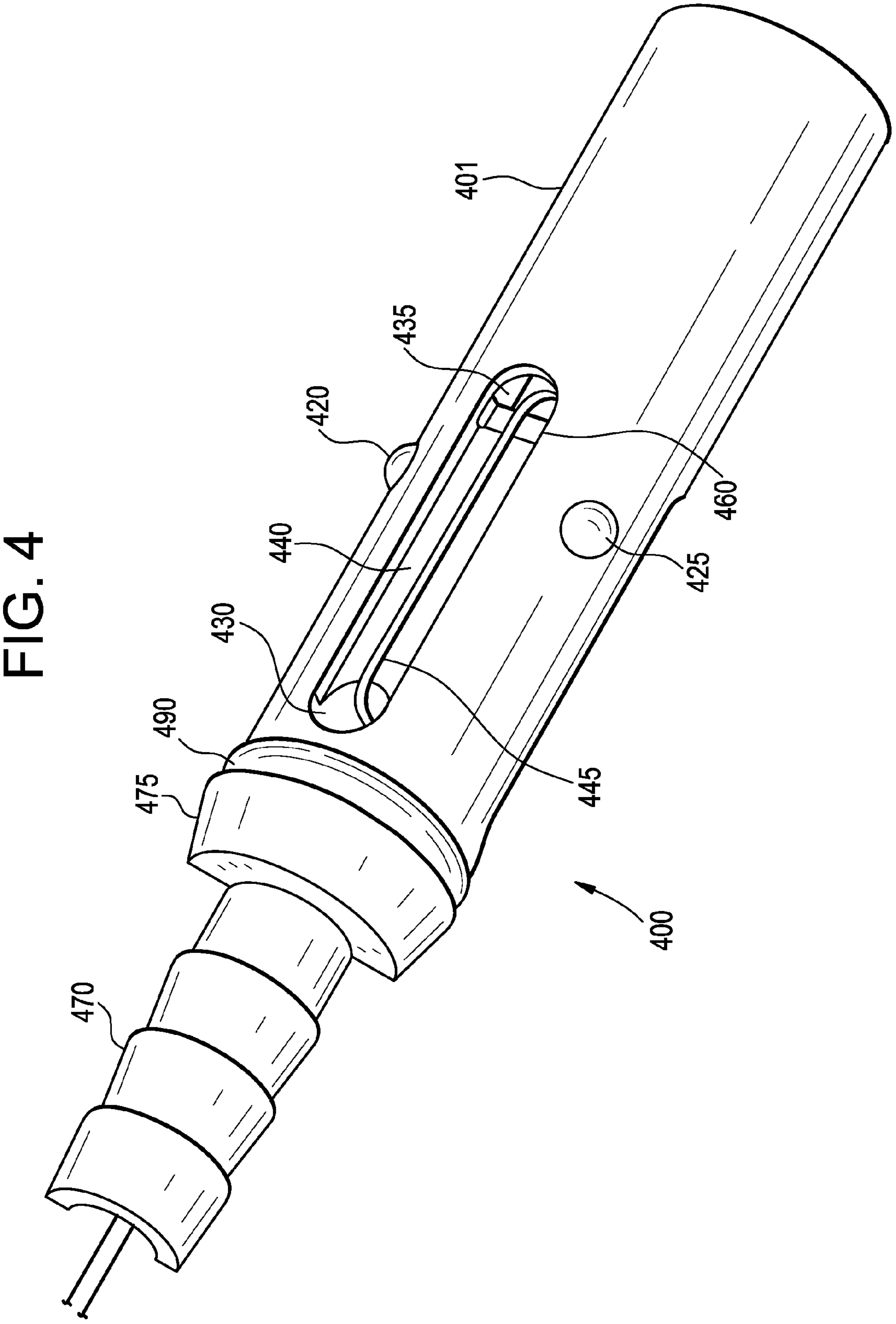
FIG. 4 is a perspective view of a probe shaft mating assembly.

FIG. 4 provides a perspective view of an exemplary probe shaft connector assembly 400 with hose barb 470, hose flange 475, O-ring 490 and connector body 401 shown, as well as locking balls 420 in their locked position. Proximal wire conduit 430, central wire conduit 440 and distal wire conduit along with wires 445 are also shown within connector body 401.

Figure 5:
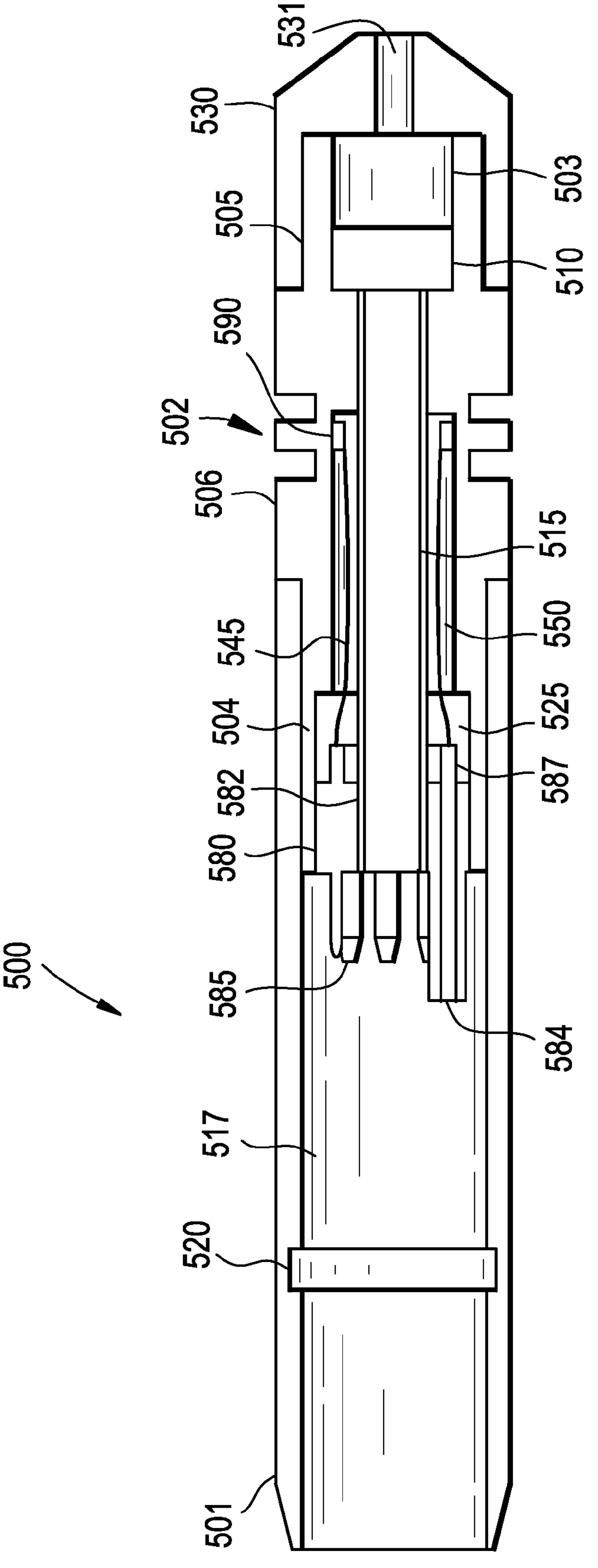
FIG. 5 is a sectional view of an exemplary probe.

FIG. 5 shows a sectional view of an exemplary probe 500. Located at the proximal end of probe 500 can be a cylindrical probe body 501. In one embodiment, probe body 501 can be made of metal (e.g., stainless steel), and can include a tapered proximal end. Probe shaft chamber 517 is a cylindrical hollow space centered within and extending through probe body 501, parallel to the sides of probe body 501. Locking ball receiver 520 can be an indented, circular groove of diameter larger than that of the probe shaft chamber 517 located within the probe shaft chamber 517 and encircling the inner surface of probe shaft chamber 517. In other embodiments, locking ball receiver 520 can be one or more discreet holes or recesses located in the probe body 501.

Figure 6:
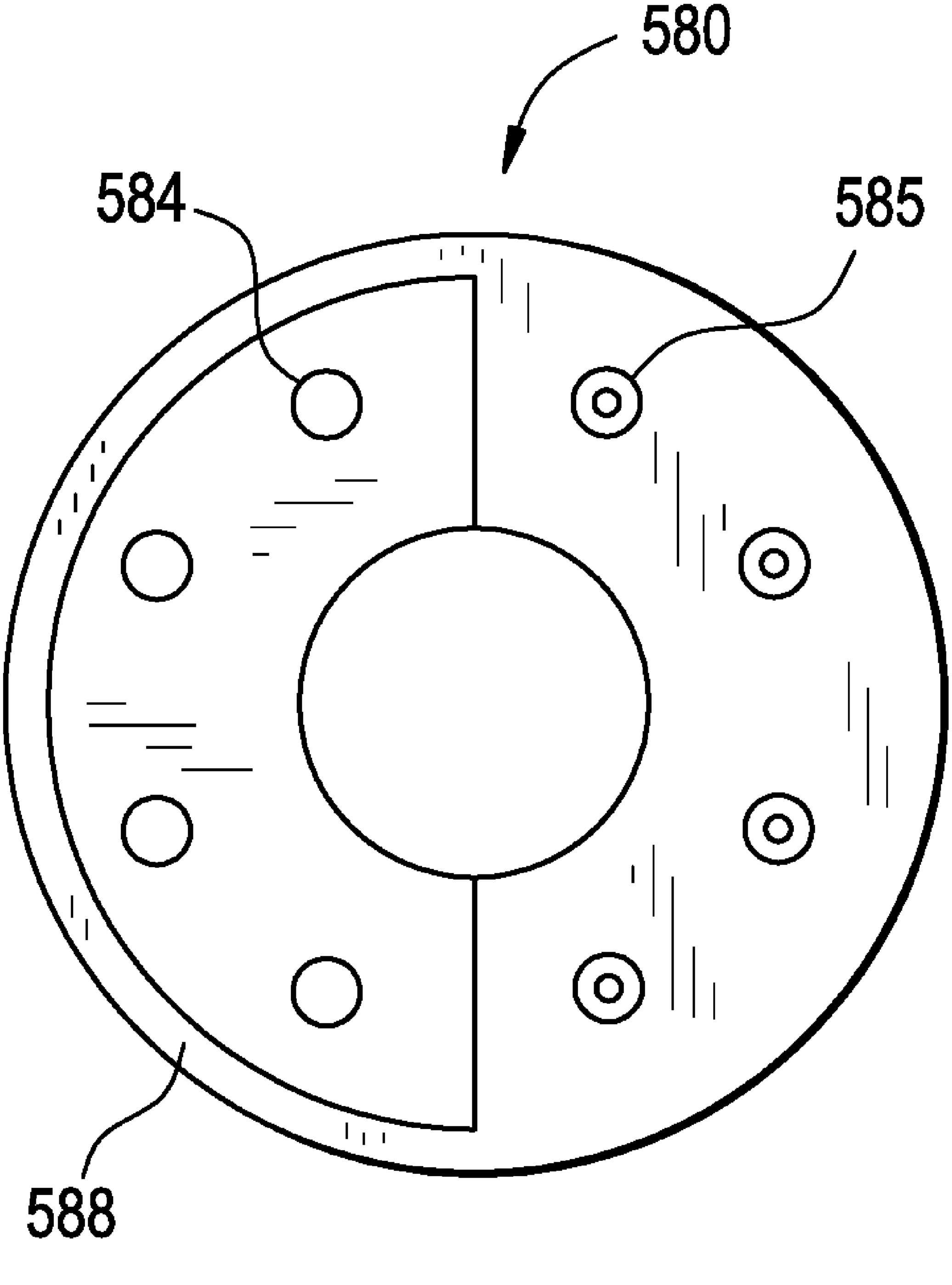
FIG. 6 is a perspective view of a probe wire connector.

Probe head 502 can be located at the distal end of probe body 501. Probe head 502 can include a probe head proximal end 504, a probe head sensor 506, and a probe head distal end 505, all of which can be integrally attached. The probe head proximal end 504 can be located within the distal end of probe body 501, and can be cylindrically shaped with an outer diameter less than that of probe shaft chamber 517 such that probe head proximal end 504 fits snugly within probe shaft chamber 517. In one embodiment, the probe head 502 is pinned and epoxied to probe body 501. In other embodiments, probe head 502 can include an integral snap-lock mechanism to connect the probe head 502 to the probe body 501. Located at the proximal end of probe head proximal end 504 can be connector chamber 525, a cylindrical hollow space running parallel to the side of probe body 501 and centered within probe 500 with a diameter less than that of the probe head proximal end 504. Probe wire connector 580 can be located within the proximal end of connector chamber 525, seated snugly within and pinned and epoxied to the inner walls of connector chamber 525. In one embodiment, probe wire connector 580 can be a cylindrical eight pin hermaphroditic Lemo connector consisting of 4 male connection pins and 4 female connection sockets located in a radial arrangement at its distal end. Each connection pin and socket can extend proximally through probe wire connector 580, and can form a radial arrangement of connector contacts 587 on the proximal end of probe shaft wire connector 580. In other embodiments, probe wire connector 580 can have fewer or more connection points providing for fewer or greater than eight wire connections. Connectors suitable for use as probe wire connector 580 are available from Lemo USA, Inc. of Rohnert Park, Calif. As shown in FIG. 6, the male connection pins 585 are grouped together in a radius on a first half of the distal surface of probe wire connector 580, while the female connection sockets 584 are grouped together in a radius on a second half of the distal surface of probe wire connector 580. The female connection sockets 584 can be embedded in a probe connector ridge 588 that extends radially around half of the circumference of the distal surface of probe wire connector 580. Connector bore 582 can be a cylindrical bore that can extend through the center of probe wire connector 580. Probe chamber 550 can be a cylindrical hollow space located adjacent to the distal end of connector chamber 525, centered within the probe head proximal end 504 and extending distally into the probe head sensor 506. Probe chamber 550 runs parallel to the outer walls of probe head sensor 506, and the diameter of probe chamber 550 can be less than that of the connector chamber 525.

Probe head sensor 506 can be located at the distal end of the probe head proximal end 504, and can be cylindrically shaped with an outer diameter equal to that of the outer surface of probe body 501. Probe head sensor 506 contains the probe electronics 590. Probe wires 545 can be attached to the connector contacts 587 of the probe wire connector 580 and can extend distally through the connector chamber 525, through the probe chamber 550 and to the probe electronics 590. Probe electronics 590 operate the probe's signal emitting and receiving functions. Probe head distal end 505 can extend distally from the distal end of probe head sensor 506, and can be cylindrically shaped with an outer diameter less than that of the probe head sensor 506. Probe head 502 can be made of plastic or an elastomeric material.

Key channel 515 can be a cylindrical sleeve that extends from the proximal end of connector bore 582 distally through the connector chamber 525, and through the probe chamber 550, having its distal end at the proximal end of probe head chamber 503. Probe head chamber 503 can be a cylindrical, hollow space of a diameter greater than that of the key channel 515. In one embodiment, key channel 515 is made of metal (e.g., stainless steel). Key channel 515 provides a smooth passageway through the probe head sensor 506, connector chamber 525 and probe wire connector 580 to allow for the insertion of an object through the probe with which to exert a distally directed force against the plunger 410. Key channel 515 is fixed in place using epoxy.

Located at the proximal end of the probe head chamber 503 can be gland 510. Gland 510 can include a plurality of sections that, when compressed together within the probe head chamber 503, form a cylindrically shaped gland. Gland 510 can be made of an elastomeric material such that when the sections are compressed together within probe head chamber 503, a waterproof seal is formed preventing liquid from entering the key channel 515. Despite the waterproof characteristic of the gland 510, a thin rigid object (e.g., a metallic rod of diameter less than that of the key channel) can be inserted between the various sections that form the gland 510 and into key channel 515. The diameter and elastomeric qualities of gland 510 are such that the frictional force of the outer surface of gland 510 against the inner walls of probe head chamber 503 hold gland 510 in place at the proximal end of probe head chamber 503. The compressional force exerted by the inner walls of probe head chamber 503 also forces the sections of gland 510 together, forming a waterproof seal.

Located at the distal end of probe head 502 can be probe nose 530. Probe nose 530 can be cylindrically shaped and have an outer diameter the same as that of probe head sensor 506. Probe head chamber 503 can be a cylindrical hollow space located at the proximal end of probe nose 530, and can be of a diameter and depth such that the proximal end of probe nose 530 fits snugly over probe head distal end 505. Extending distally from the distal end of probe head chamber 503 can be probe nose channel 531, a cylindrical hollow space of a diameter smaller than or equal to the diameter of probe head chamber 503. In one embodiment, probe nose 530 can be made of metal (e.g., stainless steel), and can have a tapered distal end. In one embodiment, probe nose 530 is pinned and epoxied to probe head 502. In other embodiments, probe nose 530 can include an integral snap-lock mechanism to connect probe nose 530 to probe head 502.

Figure 7:
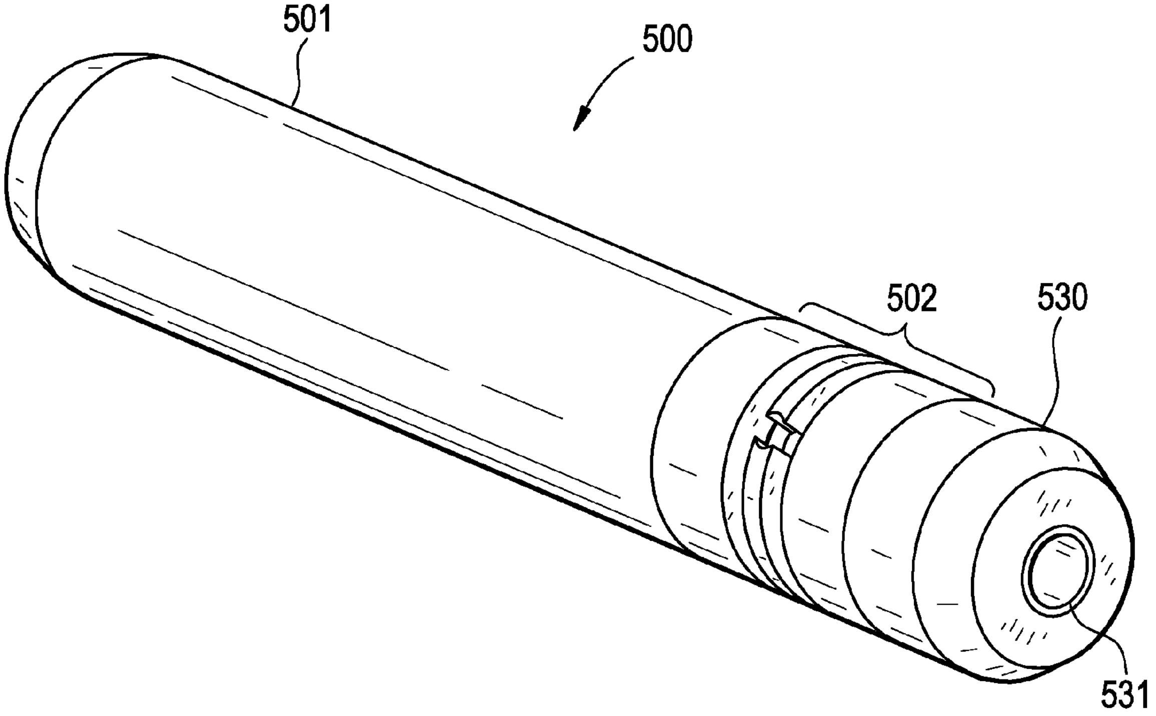
FIG. 7 is a perspective view of an exemplary probe.

FIG. 7 shows a perspective view of an exemplary probe 500, including the probe body 501, probe head 502, probe nose 530 and probe nose channel 531. The two slots encircling probe head 502 can be filled with magnetic wire and covered with epoxy.

Figure 8:
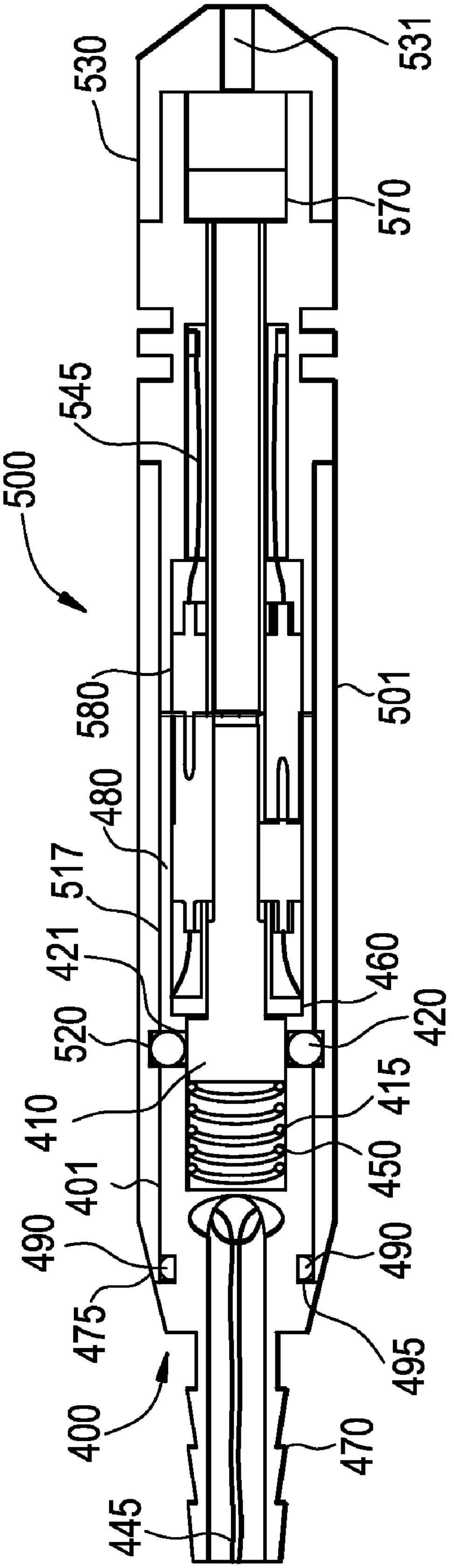
FIG. 8 is a sectional view of an exemplary interconnected probe shaft mating assembly and probe.

FIG. 8 is a sectional view of an exemplary interconnected probe shaft mating assembly 400 and probe 500. Probe 500 can be connected to probe shaft mating assembly 400 by moving probe 500 towards the distal end of probe shaft mating assembly 400 such that the distal end of connector body 401 enters probe shaft chamber 517 of probe 500. An electrical connection between the probe shaft mating assembly 400 and probe 500 can be made by matching interlocking male connector pins and female connector sockets on both the probe shaft wire connector 480 and probe wire connector 580. Opposing connector ridges 488 and 588 are arranged such that probe shaft wire connector 480 and probe wire connector 580 can only be interlocked and engaged in one orientation, thereby ensuring the proper wiring connections. In addition, the opposing connector ridges act to improve the mechanical connection between the two connectors by preventing rotation of the probe 500 while engaged with the probe shaft mating assembly 400.

In addition to the mechanical connection provided by the interlocking probe shaft and probe wire connectors 480 and 580, the locking balls 420 and locking ball receiver 520 provide an additional mechanical connection. When an operator applies a proximally directed force to the distal end of plunger rod 412, plunger 410 is pushed in a proximal direction against spring 450. To apply such a force, an operator can use any rigid object that fits within key channel 515 that is long enough to reach the distal end of plunger 410. As the plunger 410 moves proximally, the distal end of the plunger head 411 moves proximally as well, allowing locking balls 420 to fall inwardly against the plunger rod proximal section 413 and retracting towards the plunger chamber 415. With locking balls 420 retracted, probe 500 can be positioned over the connector body 401 such that the wire and probe connectors 480 and 580 are engaged, and such that the tapered proximal end of probe 500 contacts the distal end of hose flange 495. In contacting the distal end of hose flange 495, the proximal end of probe 500 compresses elastomeric O-ring 490 within notch 495, thereby providing a waterproof seal to the probe 500 and probe shaft mating assembly 400 combination. To lock the probe 500 in place on the probe shaft mating assembly 400 the operator releases plunger rod 412, allowing spring 450 to return to a relaxed, uncompressed state, pushing plunger 410 in a distal direction until the distal end of plunger head 411 comes into contact with plunger flange 460.

As the plunger head 411 is moved distally over the ball channels 421, locking balls 420 are forced in an outward direction towards the outer surface of the connector body 401, until locking balls 420 come into contact with ridges 425 which prevent further outward movement. With plunger head 411 in a relaxed position covering ball channels 421, the upper portion of locking balls 420 extend beyond the outer surface of connector body 401 and fit snugly into locking ball receiver 520 of probe 500. The locking ball 420 and locking ball receiver 520 work together to provide a mechanical connection between probe shaft mating assembly 400 and probe 500, such that the probe is not able to move proximally or distally over the probe shaft mating assembly 400.

Figure 9:
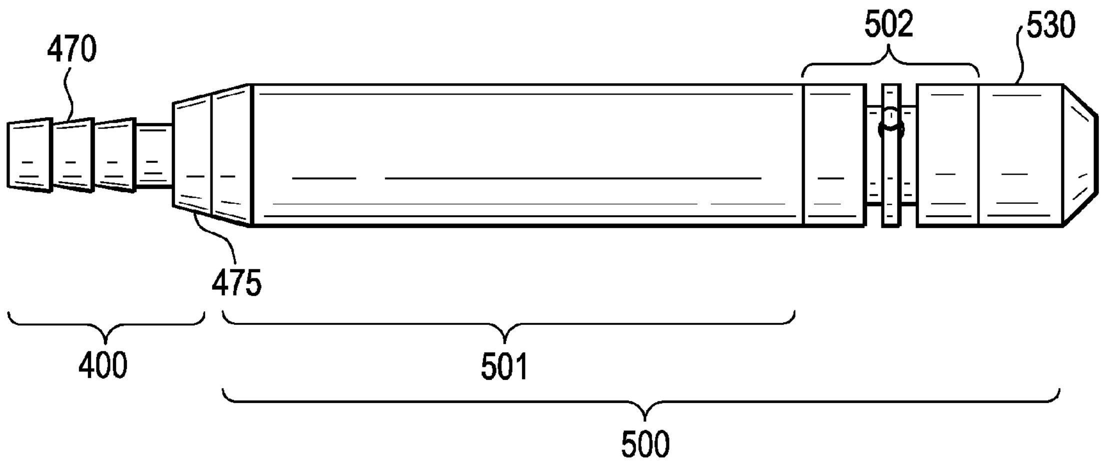
FIG. 9 is a perspective view of an exemplary interconnected probe shaft mating assembly and probe.

FIG. 9 is a perspective view of an exemplary interconnected probe shaft mating assembly 400 and probe 500, including the hose barb 470, hose flange 475 and probe 500.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A connector system for attaching a probe to a probe shaft mating assembly comprising:

a probe shaft mating assembly comprising a connector body, a plunger chamber located within said connector body, a spring located within said plunger chamber, a locking ball channel extending through said connector body from said plunger chamber to the outer surface of said connector body, a locking ball located within said locking ball channel, and a plunger located within said plunger chamber adjacent to said spring, wherein said locking ball is in contact with the outer surface of said plunger;

a probe comprising a probe body, a probe shaft chamber located within the probe shaft facing end of said probe body, and a locking ball receiver located in said probe body adjacent to said probe shaft chamber;

a key channel extending at least partially through said probe, wherein said key channel provides access for an elongated object to contact said plunger when said probe and said probe shaft mating assembly are interlocked;

a gland located within a probe head chamber located between the distal end of said key channel and a probe nose channel that extends from said probe head chamber to the distal end of said probe, wherein said gland is comprised of a plurality of compressed elastomeric members that provide a waterproof seal to said key channel while allowing said elongated object to extend through said gland;

wherein the diameter of said probe shaft chamber is larger than that of said probe shaft mating assembly such that when said plunger and said spring are moved from a first position to a second position, said locking ball moves inwardly towards said plunger chamber and below the outer surface of said connector body allowing the probe facing end of said probe shaft mating assembly to enter said probe shaft chamber, and when said plunger and spring are moved from said second position to said first position, said locking ball moves towards the surface of said connector body, extending beyond the outer surface of said connector body such that said locking ball engages said locking ball receiver and fixes said probe to said probe shaft mating assembly.

2. The connector system of claim 1 wherein said outer surface of said plunger is stepped such that said locking ball is in contact with a larger diameter portion of said plunger when said plunger is in said first position, and said locking ball is in contact with a smaller diameter portion of said plunger when said plunger is in said second position.

3. The connector system of claim 1 wherein said outer surface of said plunger is sloped such that said locking ball is in contact with a larger diameter portion of said plunger when said plunger is in said first position, and said locking ball is in contact with a smaller diameter portion of said plunger when said plunger is in said second position.

4. The connector system of claim 1 wherein said spring is uncompressed in said first position and compressed in said second position.

5. The connector system of claim 1 further comprising an O-ring positioned at the probe shaft end of said connector body, wherein said O-ring is compressed by said probe body when said probe shaft mating assembly and said probe are in an interlocked position, thereby forming a waterproof seal.

6. The connector system of claim 1 further comprising a wire conduit located in said connector body and a probe wire connector located within said probe facing end of said probe shaft mating assembly, wherein said wire conduit comprises an open path for electrical wires to travel from said probe shaft to said probe wire connector without entering said plunger chamber.

7. The connector system of claim 1 wherein the diameter of said locking ball channel narrows near said surface of said connector body.

8. The connector system of claim 1 wherein said locking ball receiver comprises an indented groove at least partially encircling the inner surface of said probe body.

9. The connector system of claim 1 wherein said locking ball receiver comprises a recess located on the inner surface of said probe body.

10. The connector system of claim 1 wherein said locking ball receiver comprises a channel in said probe body.

11. The connector system of claim 1, further comprising a probe shaft wire connector located within said probe facing end of said probe shaft mating assembly and a probe wire connector located within said probe shaft facing end of said probe, wherein when said probe shaft mating assembly is interlocked with said probe, said probe shaft wire connector and said probe wire connector form an electrical connection between said probe shaft mating assembly and said probe.

12. A connector system for attaching a probe to a probe shaft mating assembly comprising:

a probe shaft mating assembly comprising a connector body, a plunger chamber located within said connector body, a spring located within said plunger chamber, a locking ball channel extending through said connector body from said plunger chamber to the outer surface of said connector body, a locking ball located within said locking ball channel, and a plunger located within said plunger chamber adjacent to said spring, wherein said outer surface of said plunger is stepped such that said locking ball is in contact with the outer surface of a larger diameter portion of said plunger when said plunger is in said first position, and said locking ball is in contact with the outer surface of a smaller diameter portion of said plunger when said plunger is in said second position;

a probe comprising a probe body, a probe shaft chamber located within the probe shaft facing end of said probe body, and a locking ball receiver located in said probe body adjacent to said probe shaft chamber;

a key channel extending at least partially through said probe, wherein said key channel provides access for an elongated object to contact said plunger when said probe and said probe shaft mating assembly are interlocked;

a gland located within a probe head chamber located between the distal end of said key channel and a probe nose channel that extends from said probe head chamber to the distal end of said probe, wherein said gland is comprised of a plurality of compressed elastomeric members that provide a waterproof seal to said key channel while allowing said elongated object to extend through said gland;

wherein the diameter of said probe shaft chamber is larger than that of said probe shaft mating assembly such that when said plunger and said spring are moved from a first position to a second position, said spring is compressed and said locking ball moves inwardly towards said plunger chamber and below the outer surface of said connector body allowing the probe facing end of said probe shaft mating assembly to enter said probe shaft chamber, and when said plunger and spring are moved from said second position to said first position, said spring is uncompressed and said locking ball moves towards the surface of said connector body, extending beyond the outer surface of said connector body such that said locking ball engages said locking ball receiver and fixes said probe to said probe shaft mating assembly.

* * * * *